May 22, 1956  F. F. HURLBURT ET AL  2,746,778
JOURNAL BOX GREASE SEAL
Filed April 17, 1953

Fred F. Hurlburt
Charles H. Gillispie
INVENTORS

BY Clarence A. O'Brien
and Harvey B. Jacobson
Attorneys

United States Patent Office 2,746,778
Patented May 22, 1956

2,746,778

JOURNAL BOX GREASE SEAL

Fred F. Hurlburt and Charles H. Gillispie, Cedar City, Utah, assignors of twenty per cent to Harold F. Hurlburt, Couperville, Wash., twenty per cent to Edward M. Hurlburt, Rock River, Wyo., and twenty per cent to Grace Hurlburt Lezer, Ogden, Utah Application April 17, 1953, Serial No. 349,372

2 Claims. (Cl. 286—6)

This invention relates generally to railroad vehicles and pertains more particularly to an improved grease seal construction for railroad vehicle journal boxes.

A primary object of this invention is to provide an improved grease seal construction for journal boxes which incorporates a novel clamping mechanism for maintaining the grease seal in proper engagement with the journals.

Another object of this invention is to provide an improved form of grease seal construction for railroad vehicle journal boxes which includes a clamping band embracing a resilient or pliable sealing ring and manually operable means for adjusting the tension of the clamping band.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
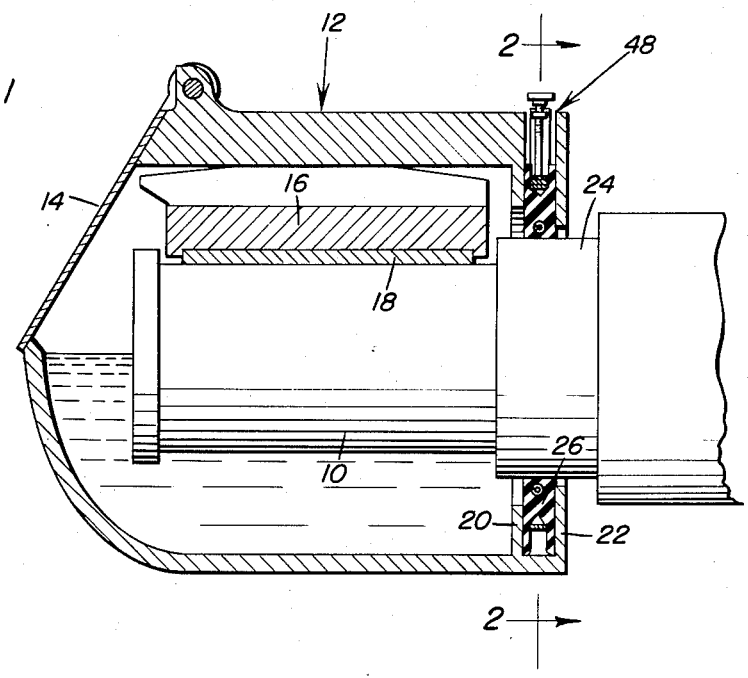
Figure 1 is a vertical section taken through the improved form of journal box and sealing assembly.

Referring now particularly to the drawings, reference numeral 10 indicates a journal shaft which constitutes the usual axle for railway vehicles and reference character 12 indicates generally a journal box housing provided at its outer end with an inspection and filler opening provided with a hinged closure member 14. The housing also includes an integral backing plate 16 provided with suitable bearing material 18 which engages the outer surface of the journal 10. The inner end of the journal box housing is provided with a pair of inwardly projecting flanges 20 and 22, the outer of which 22, projects inwardly in more closely spaced relationship to the enlarged shoulder 24 on the journal than does the flange 20. The flanges present an annular groove within which the pliable sealing ring 26 is seated, the inner surface of this sealing ring being sealingly engaged against the outer surface of the enlarged shoulder 24. In this respect, it will be noted that the annular coil spring 28 embedded in the sealing ring will be pre-tensioned so as to serve to maintain the ring in proper engagement with the shoulder.

Figure 2:
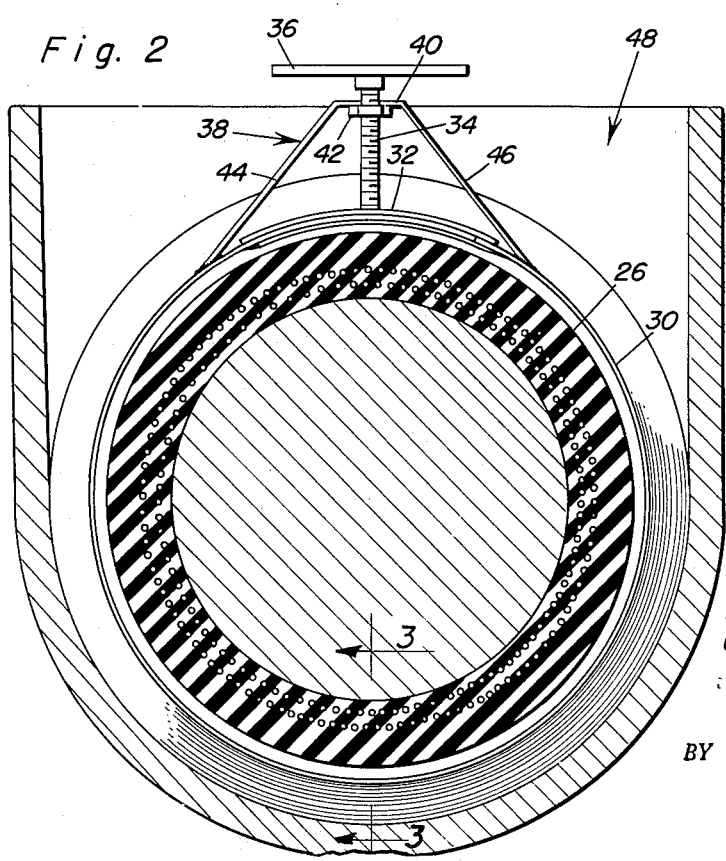
Figure 2 is an enlarged vertical section taken substantially along the plane of section line 2—2 of Figure 1 showing details of the assembly.
Figure 3:
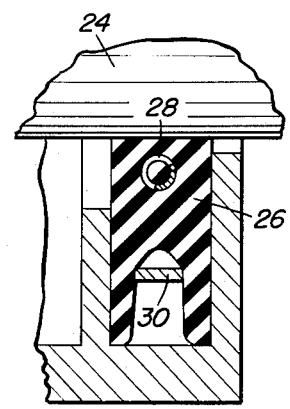
Figure 3 is a further enlarged vertical section taken substantially along the plane of section line 3—3 of Figure 2 showing a cross-sectional detail of the improved sealing ring in position in the journal box.

The outer circumferential portion of the sealing ring is annularly grooved and receives therein the resilient strap 30 which extends completely around the ring and terminates at its opposite ends in overlapped relation as seen more clearly in Figure 2.

An arcuate bearing plate 32 is disposed in overlying relation to one of the free ends of the strap 30 at the point of overlap of its opposite ends and this plate is adapted to serve as a bearing plate for the threaded bearing post 34 which is provided at its upper free end with the manual cranking lever 36. A clamping element 38 is provided with a medial portion 40 suitably carrying a nut 42 which is threadedly engaged on the post 34 and the clamping element also includes depending mutually divergent legs 44 and 46 extending from opposite ends of the medial portion and connected at their ends to the strap at points spaced from the respective free ends thereof.

In this manner, it will be seen that rotation of the clamping post by means of the lever 36 will force the medial portion 40 either toward or away from the bearing plate 32 to effect the proper clamping of the strap 30 upon the sealing ring to thus procure the proper sealing contact between the ring and the shoulder 24. The clamping element 38 and its manually operated mechanism 34 and 36 projects radially outwardly of the journal box housing and the latter is, of course, radially slotted as at 48 to provide an opening therefor.

The many advantages of this particular type of construction will be readily apparent when it is realized that the ease with which the sealing engagement between the ring and the journal shafts may be adjusted to the proper and desired tension. A casual inspection of the rear of the journal box housing will determine whether or not grease is leaking therefrom so that the sealing assembly may be accordingly adjusted to prevent loss of oil or grease from the journal box interior. These assemblies may be easily periodically checked at various points along the route of travel of the railway vehicle and it will be readily appreciated that the proper sealing engagement between the ring and the journal shaft is of prime importance in preventing the journal box housing from running dry of oil or lubricant which would result in the occurrence of a "hot box" as is well understood in the art.

The two radial flanges defining the circumferential annular groove in the pliable sealing ring serve not only to provide a proper seat for the clamping band but also allow ease of initial installment of the sealing ring within its associated groove in the journal box housing, that is, the radial flanges can be readily deformed or bent for inserting the assembly through the small aperture defined by the radial flanges of the journal box housing. In this respect, it will be noted that the inner journal box flange 20 prevents a larger opening than does the outer flange so that the sealing ring is most easily inserted from the interior of the device although it is equally possible to install the assembly from the outer side of the journal box.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A grease seal assembly for journal boxes containing a lubricant including an annular seal ring of pliable sealing material concentrically disposed on the outer periphery of the journal shaft disposed in the journal box, said seal ring including means for urging said seal ring into engagement with said journal shaft, said journal box including a pair of parallel inwardly directed annular flanges concentric relative to said journal shaft, the outer periphery of said seal ring being retained between said flanges, means engaging the outer periphery of said seal ring within said flanges for urging said seal ring into engagement with oppositely disposed faces of said flanges and the journal shaft, and adjusting means operatively connected to said last-mentioned means and extending out of said journal box for applying pressure on said seal ring, said seal ring including a pair of annular radial flanges engageable with the oppositely disposed faces of the flanges on said journal box, said means engaging the outer periphery of said ring comprising an elongated strap having overlapped ends, said strap being concentrically disposed on said seal ring within the radial flanges thereon, said adjusting means being engaged with said overlapped ends for applying tension thereto and pressure to said seal ring.

2. A grease seal assembly as set forth in claim 1 wherein the means for urging said seal ring into engagement with said journal shaft comprises a pre-tensioned annular coil spring embedded in said seal ring adjacent the inner peripheral portion thereof which engages said journal shaft.

References Cited in the file of this patent

UNITED STATES PATENTS

| | | |
|---|---|---|
| 404,701 | Goullioud | June 4, 1889 |
| 558,693 | Korbuly | Apr. 21, 1896 |
| 1,854,708 | Mastin et al. | Apr. 19, 1932 |
| 1,871,299 | Bragg et al. | Aug. 9, 1932 |
| 2,231,690 | Sheldrick et al. | Feb. 11, 1941 |

FOREIGN PATENTS

| | | |
|---|---|---|
| 367,771 | Germany | Jan. 26, 1923 |
| 755,478 | France | Sept. 11, 1933 |